United States Patent
Kim et al.

(10) Patent No.: US 12,155,045 B2
(45) Date of Patent: Nov. 26, 2024

(54) BATTERY CELL INSPECTION DEVICE AND BATTERY CELL INSPECTION SYSTEM INCLUDING THE SAME

(71) Applicant: SK On Co., Ltd., Seoul (KR)

(72) Inventors: Sang Min Kim, Daejeon (KR); Yong Jung Kim, Daejeon (KR); Dong Whan Shin, Daejeon (KR)

(73) Assignee: SK ON CO., LTD., Seoul (KR)

( * ) Notice: Subject to any disclaimer, the term of this patent is extended or adjusted under 35 U.S.C. 154(b) by 214 days.

(21) Appl. No.: 17/707,525

(22) Filed: Mar. 29, 2022

(65) Prior Publication Data
US 2022/0320606 A1 Oct. 6, 2022

(30) Foreign Application Priority Data
Mar. 31, 2021 (KR) .................. 10-2021-0041724

(51) Int. Cl.
*H01M 10/42* (2006.01)
*G01B 11/24* (2006.01)
*H01M 50/105* (2021.01)

(52) U.S. Cl.
CPC ......... *H01M 10/4285* (2013.01); *G01B 11/24* (2013.01); *H01M 50/105* (2021.01)

(58) Field of Classification Search
CPC ...... G01B 11/24; G01B 11/30; H01M 10/425; H01M 10/4285; H01M 50/105; Y02E 60/10; G01N 2021/8854; G01N 2021/8887; G01N 21/8851

USPC ......................................................... 356/361
See application file for complete search history.

(56) References Cited

FOREIGN PATENT DOCUMENTS

| EP | 2479556 A2 | 7/2012 |
|---|---|---|
| JP | 2007-265863 A | 10/2007 |
| JP | 2015-065178 A | 4/2015 |
| KR | 10-0982025 B1 | 9/2010 |
| KR | 10-2015-0026172 A | 3/2015 |
| KR | 10-1517044 B1 | 5/2015 |
| KR | 10-2015-0106586 A | 9/2015 |
| KR | 10-1764948 B1 | 8/2017 |
| KR | 10-2018-0029856 A | 3/2018 |
| KR | 10-2018-0084540 A | 7/2018 |
| KR | 10-1960950 B1 | 3/2019 |
| KR | 10-2014050 B1 | 8/2019 |
| KR | 10-2020-0086907 A | 7/2020 |
| KR | 10-2022-0022849 A | 2/2022 |

OTHER PUBLICATIONS

Extended European Search Report for the European Patent Application No. 22163606.1 issued by the European Patent Office on Jun. 25, 2024.

*Primary Examiner* — Tri T Ton
(74) *Attorney, Agent, or Firm* — IP & T GROUP LLP

(57) ABSTRACT

The present invention relates to a battery cell of a secondary battery, and more particularly, to a battery cell inspection device and system for deciding whether a battery cell is good or bad based on a bent degree of a bend formed on one side surface of the battery cell.

15 Claims, 6 Drawing Sheets

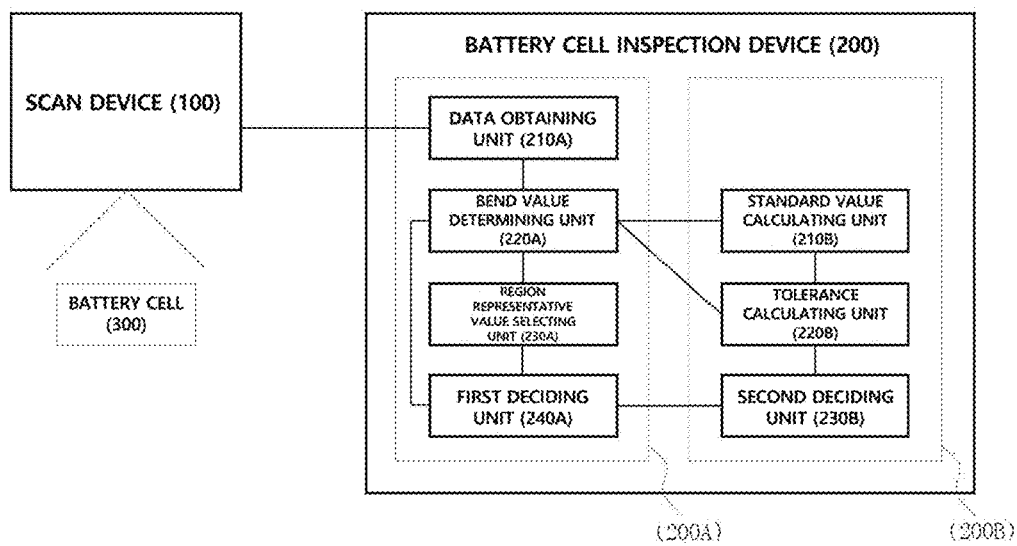
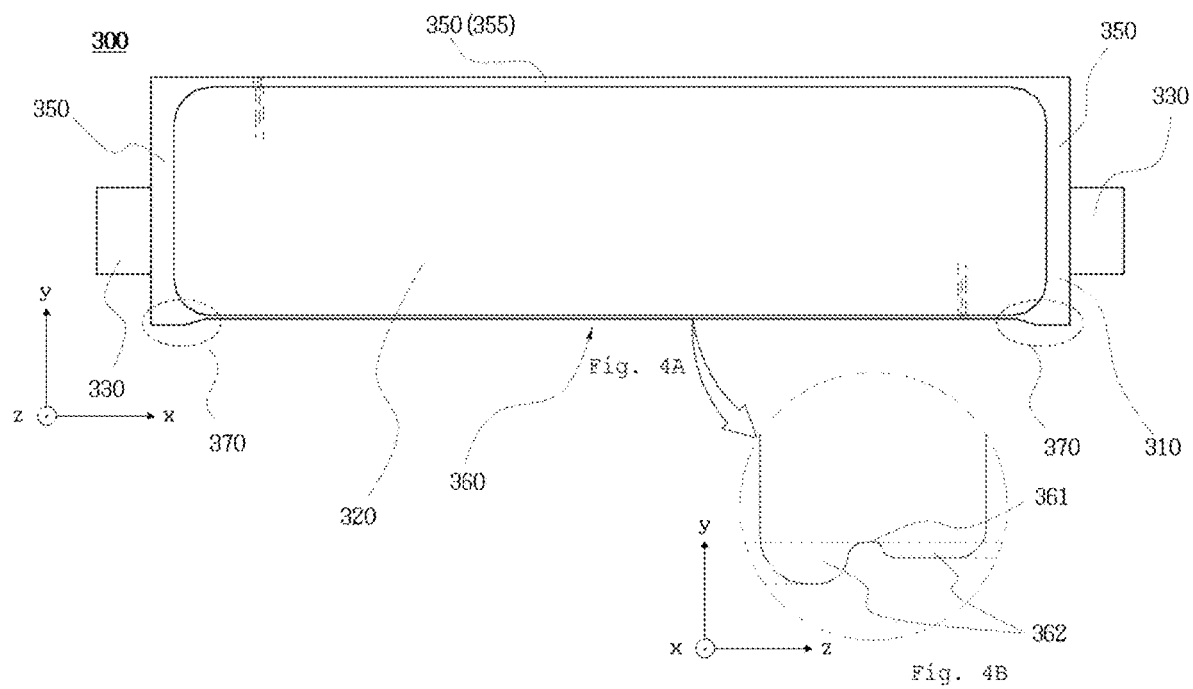

BATTERY CELL INSPECTION DEVICE AND BATTERY CELL INSPECTION SYSTEM INCLUDING THE SAME

CROSS-REFERENCE TO RELATED APPLICATIONS

This application claims priority under 35 U.S.C. § 119 to Korean Patent Application No. 10-2021-0041724, filed on Mar. 31, 2021, in the Korean Intellectual Property Office, the disclosure of which is incorporated herein by reference in its entirety.

TECHNICAL FIELD

The following disclosure relates to a battery cell of a secondary battery, and more particularly, to a battery cell inspection device and system for deciding whether a battery cell is good or bad based on a bent degree of a bend formed on one side surface of the battery cell.

BACKGROUND

Recently, rechargeable secondary batteries have been widely used as energy sources of wireless mobile devices. In addition, the secondary batteries have also attracted attention as power sources of electric vehicles (EVs), hybrid electric vehicles (HEVs), plug-in hybrid electric vehicles (Plug-In HEVs), and the like, that have been suggested as solutions for solving air pollution or the like of existing gasoline vehicles, diesel vehicles and the like using fossil fuel.

Small mobile devices require a low operating voltage in operating one device, while medium or large-sized devices such as vehicles require high-output and large-capacity energy sources and thus, use medium or large-sized battery modules in which a plurality of battery cells are electrically connected to each other and a battery pack in which the battery modules are electrically connected to each other.

The battery cells constituting such a medium or large-sized battery module may be configured as rechargeable batteries that are rechargeable, and the battery cells generate a lot of heat in a charging/discharging process as they have a high output and a large capacity. When the heat generated in the charging/discharging process as described above is not effectively removed, a deterioration phenomenon is promoted, and in some cases, ignition or explosion may be caused.

Accordingly, in order to improve heat dissipation performance, a method of removing heat generated from the battery cells by filling an empty space between the battery cells and a module case with a thermally conductive polymer resin (gap filler gel) has been used. FIG. 1 is a schematic view illustrating a battery module. As illustrated in FIG. 1, a battery module 5 may have a structure in which a polymer resin layer 2 is provided inside a module case 1 and battery cells 3 are seated on the polymer resin layer 2.

Meanwhile, the battery cells may be classified into a cylindrical battery cell, a can-type battery cell, a pouch-type battery cell, and the like, according to their shapes. Among them, the pouch-type battery cell that may be stacked with a high degree of integration, has a high energy density per weight, is inexpensive, and is easily deformed have attracted a lot of attention. In general, the pouch-type battery cell has a structure in which an electrode assembly is embedded in a pouch-type case formed of an aluminum laminate sheet. That is, the pouch-type battery cell is manufactured by forming a receiving part for mounting the electrode assembly in the laminate sheet and by heat-sealing a separate sheet separated from or a sheet extending from the laminate sheet in a state in which the electrode assembly is mounted in the receiving part.

FIGS. 2A to 2C are schematic views illustrating a process of manufacturing a conventional battery cell, in which FIG. 2A is a schematic vertical cross-sectional view illustrating a laminate sheet formed of one unit member, that is, a structure in which two receiving parts are formed on a pouch case. Referring to FIG. 2A, a pouch case includes a first receiving part 11 and a second receiving part 12 formed to have a structure recessed in a vertical direction, and includes a bridge part 13 formed to connect the first and second receiving parts 11 and 12 to each other. The first receiving part 11 is positioned on the left side of the bridge part 13, and the second receiving part 12 is positioned on the right side of the bridge part 13.

FIG. 2B is a schematic view illustrating a process of bending the bridge part so that the receiving parts of FIG. 2A come into contact with each other, and FIG. 2C is a schematic view illustrating that an electrode assembly is received in the pouch case in a state in which the receiving parts are in contact with each other by bending the bridge part. Referring to FIG. 2B, an electrode assembly 20 is mounted on the second receiving part 12, and the touch case is bent with the bridge part 13 as the center that the first receiving part 11 and the second receiving part 12 may come into contact with each other. Referring to FIG. 2C, the electrode assembly 20 is received in the pouch case 10 in a state in which it is surrounded by the first receiving part 11 and the second receiving part 12, and a dent phenomenon in which a specific portion A of the bridge part 13 is dented in a state in which outer sides of the first receiving part 11 and the second receiving part 12 coincide with each other by bending the bridge part 13 occurs.

As described above, in the pouch-type battery cell, a W-shaped bend is generated on one side surface of the battery cell corresponding to the bridge part because the bridge part of the pouch case is bent. In this case, as described above, the battery module has the structure in which the battery cells are seated on the polymer resin layer, and the above-described W-shaped bend may be formed on one side surface of the battery cell in contact with the polymer resin layer. Accordingly, when a bent degree of the W-shaped bend formed on one side surface of the battery cell is large, an excessive space is generated between the polymer resin layer and the battery cell, such that heat dissipation performance is deteriorated, and when a difference between bent degrees of bends formed on one side surfaces of the respective battery cells is large, an application amount of the polymer resin layer provided in the battery module may not be constantly maintained.

Accordingly, it is necessary to decide whether the battery cell is good or bad in consideration of the bent degree of the bend formed on one side surface of the battery cell and select good battery cells that may be mounted in the battery module among the manufactured battery cells.

RELATED ART DOCUMENT

[Patent Document]
(Patent Document 1) Korea Patent No. 1517044 (registered on Apr. 27, 2015)

SUMMARY

An embodiment of the present invention is directed to providing a battery cell inspection device for deciding whether a battery cell is good or bad based on a bent degree of a bend formed on one side surface of the battery cell, and a battery cell inspection system including the same.

In one general aspect, a battery cell inspection device includes: a data obtaining unit obtaining scan data obtained by scanning one side surface of a battery cell from a scan device scanning the one side surface; a bend value determining unit determining a bend value indicating a bent degree of one side surface positioned at a corresponding point at each point of the one side surface based on information on each of different points of the one side surface included in the scan data; and a first deciding unit deciding whether the battery cell is good or bad based on bend values determined for each point of the one side surface by the bend value determining unit.

The bend value determining unit may calculate a distance from the lowest point to the highest point of a bend of one side surface positioned at each point, and determine the calculated distance as a bend value of each point.

The battery cell inspection device may further include a region representative value selecting unit dividing the one side surface into a plurality of regions and selecting a maximum value of bend values of each of the points belonging to each region as a representative value of the corresponding region, wherein the first deciding unit additionally decides whether the battery cell is good or bad based on representative values selected for each region by the region representative value selecting unit.

The first deciding unit may decide that the battery cell is a good battery cell when all of the representative values of the respective regions are equal to or less than a first reference value, and decide that the battery cell is a bad battery cell when at least one of the representative values of the respective regions exceeds the first reference value.

When at least one of the representative values of the respective regions exceeds a first reference value, the first deciding unit may decide that the battery cell is a good battery cell when the number of representative values exceeding the first reference value among the representative values is equal to or less than a reference number, and decide that the battery cell is a bad battery cell when the number of representative values exceeding the first reference value among the representative values exceeds the reference number.

The battery cell inspection device may further include: a standard value calculating unit calculating a standard value for deciding a degree at which the respective bend values are spread out based on the bend values determined for each point of the one side surface by the bend value determining unit; a tolerance calculating unit calculating a tolerance corresponding to a difference between the bend value of each point and the standard value at each point of the one side surface; and a second deciding unit deciding whether the battery cell is good or bad based on the tolerances calculated for each point of the one side surface by the tolerance calculating unit.

The second deciding unit may decide that the battery cell is a good battery cell when all of magnitudes of each of the tolerances are equal to or less than a second reference value, and decide that the battery cell is a bad battery cell when a magnitude of at least one of the tolerances exceeds second reference value.

The first deciding unit may primarily decide whether the battery cell is good or bad, and the second deciding unit may secondarily decide whether only a battery cell decided as a good battery cell by the first deciding unit is good or bad.

The standard value calculating unit may calculate an average value of the respective bend values and set the calculated average value as the standard value.

The standard value calculating unit may calculate a line fitted value of the respective bend values and set the calculated line fitted value as the standard value.

In another general aspect, a battery cell inspection system includes: a scan device scanning one side surface of the battery cell; and the battery cell inspection device as described above.

The scan device may be a laser line sensor and may generate a profile for each of different points of the one side surface, and the bend value determining unit may determine the bend value of each point by analyzing the profile of each point.

The scan device may not scan a partial region of an entire region of the one side surface.

The partial region that is not scanned by the scan device may include extension parts formed on the one side surface of the battery cell.

The scan device may scan the one side surface of the battery cell simultaneously with a process of folding a wing part of the battery cell.

BRIEF DESCRIPTION OF THE DRAWINGS

FIG. 3 is a block diagram of a battery cell inspection system according to an embodiment of the present invention.

FIGS. 4A and 4B are views illustrating a battery cell according to an embodiment of the present invention.

DETAILED DESCRIPTION OF MAIN ELEMENTS

Figure 1:
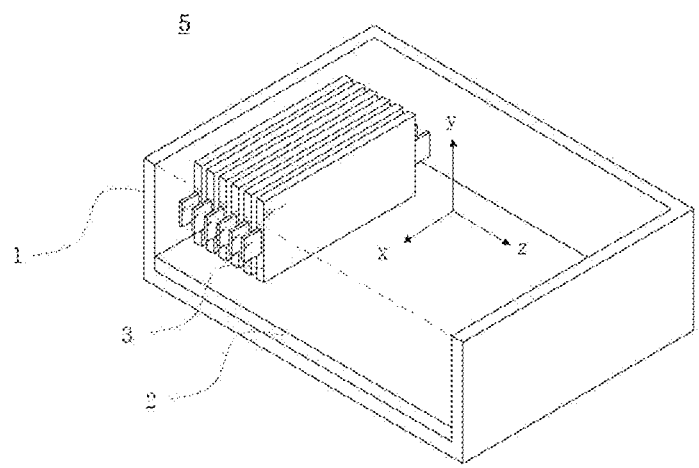
FIG. 1 is a schematic view illustrating a battery module.
Figure 2A:
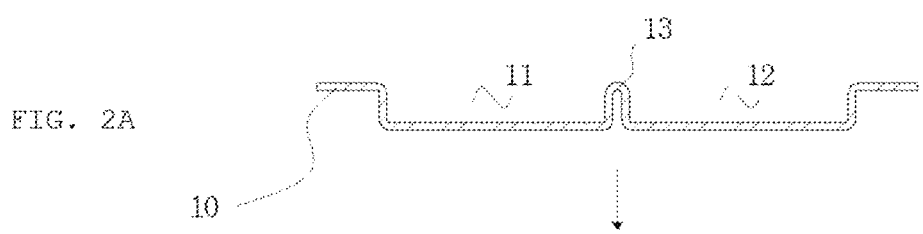
FIGS. 2A to 2C are schematic views illustrating a process of manufacturing a conventional battery cell.
Figure 2B:
Figure 2C:
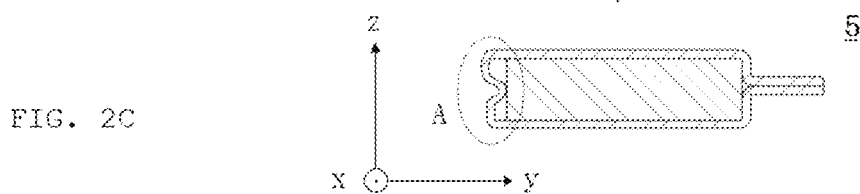

10: battery cell inspection system
100: scan device
200: battery cell inspection device
200A: first good/bad decision unit
210A: data obtaining unit
220A: bend value determining unit
230A: region representative value selecting unit 240A: first deciding unit
200B: second good/bad decision unit
210B: standard value calculating unit
220B: tolerance calculating unit
230B: second deciding unit

DETAILED DESCRIPTION OF EMBODIMENTS

Throughout the present specification, terms such as " . . . unit," " . . . device," and " . . . system," refer to a unit processing an operation of one function or a combination of two or more functions, and may be implemented as hardware, software, or a combination of hardware and software.

Various methods described herein may be implemented together with hardware or software or may be implemented together with a combination of hardware and software if appropriate. As used herein, terms such as "unit," "device," and "system," may be treated as equivalent to a computer-related entity, that is, hardware, a combination of hardware and software, software, or software in execution. In addition, an application program executed in the present invention may be configured in units of "units", and may be recorded in one physical memory or may be recorded in two or more memories or recording media in a distributed manner in a form in which it may be read, written, and erased.

Hereinafter, the present invention will be described in detail with reference to the accompanying drawings.

FIG. 3 is a block diagram of a battery cell inspection system according to an embodiment of the present invention. A battery cell inspection system 10 according to the present invention mainly includes a scan device 100 scanning a battery cell 300 and a battery cell inspection device 200.

First, a battery cell 300 according to the present invention will be described as follows. FIGS. 4A and 4B are views illustrating a battery cell according to an embodiment of the present invention, wherein FIG. 4A is a plan view of the battery cell, and FIG. 4B is a side cross-sectional view of any one point of one side surface of the battery cell. FIG. 4B is not an enlarged view of the one point when viewed from the top (z direction in FIGS. 4A and 4B), but is an enlarged view of a side cross section of the one point when viewed from a side surface (x direction in FIGS. 4A and 4B).

As illustrated in FIG. 4A, in the battery cell 300, an electrode assembly 320 may be accommodated in pouch cases 310, and sealing parts 350 may be formed by sealing the pouch cases 310 extending to three surfaces around the electrode assembly 320 and overlap each other in a vertical direction. Here, a sealing part 350 of a surface on which an electrode lead does not exist among the sealing parts 350 of the three surfaces is referred to as a wing part 355 of the battery cell.

The remaining one surface of the battery cell 300 is a surface corresponding to the above-described bridge part of the pouch case 310, does not have a sealing part at which the pouch cases overlapping each other in the vertical direction are sealed to each other, and may have a structure in which the pouch case 310 is in direct close contact with a side surface of the electrode assembly 320. In this case, as described in the background, on one side surface 360 of the battery cell corresponding to the bridge part of the pouch case 310, a dent phenomenon in which a central portion of the pouch case 310 is dented occurs, such that the W-shaped bend may be formed. Hereinafter, in the present invention, one side surface 360 of the battery cell may refer to a side surface on which the W-shaped bend is formed in the battery cell, and the above-described wing part 355 may be formed on the other side surface of the battery cell opposite to one side surface 360 of the battery cell.

That is, on one side surface 360 of the battery cell, as illustrated in FIG. 4B, a dent part 361 may be formed at a central portion, and protrusion parts 362 may be formed on both sides of the dent part. The protrusion parts 362 are generally formed on one side and the other side of the dent part 361, respectively, with the dent part 361 interposed therebetween, but are not limited thereto, and two or more protrusion parts may be formed in a process of folding the pouch case or one protrusion part may be formed on only one side of the dent part 361 and the other side of the dent part 361 may be formed to be flat.

Meanwhile, extension parts 370 may be further formed on one side surface 360 of the battery cell as illustrated in FIG. 4A. The extension parts 370 correspond to sealing joining parts positioned at portions where one side surface 360 of the battery cell is adjacent to both side surfaces on which electrode leads 330 of the battery cell are positioned, and the sealing joining parts corresponds to parts protruding by a predetermined length in a direction perpendicular to both side surfaces of the battery cell 300 in a process of folding the pouch case 310 in order to package a battery module. The extension parts 370 may serve to maintain a disposition of the battery cell or to fix the battery cell when the battery cell is seated on a polymer resin layer in the battery module.

Figure 5:
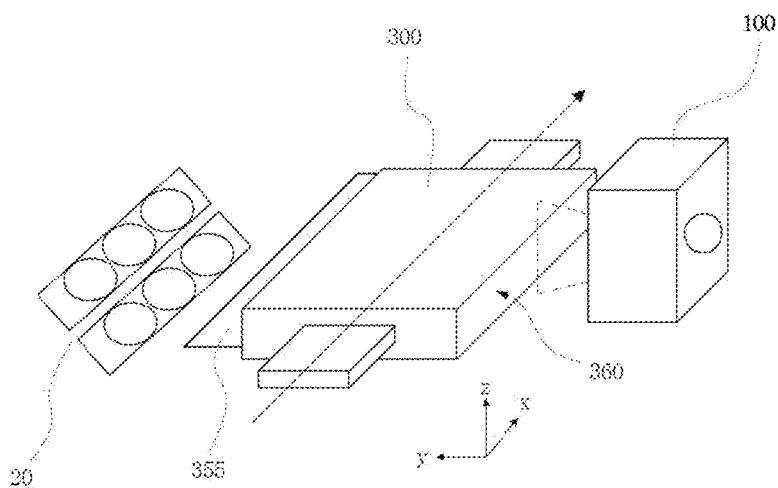
FIG. 5 is a schematic view illustrating that a scan device according to an embodiment of the present invention scans one side surface of the battery cell.

Next, a scan device 100 according to the present invention will be described. FIG. 5 is a schematic view illustrating that a scan device according to an embodiment of the present invention scans one side surface of the battery cell, and the scan device 100 scans one side surface 360 of the battery cell to generate scan data.

The scan device 100 may be, for example, a three dimensional (3D) laser line sensor, and a scan line of the scan device 100 is formed in a direction (z direction in FIG. 5) perpendicular to a length direction (x direction in FIG. 5) of the battery cell, as illustrated in FIG. 5, such that the scan device 100 may scan a shape of a cross section at any one point of one side surface 360 of the battery cell as illustrated in FIG. 4B.

Figure 6:
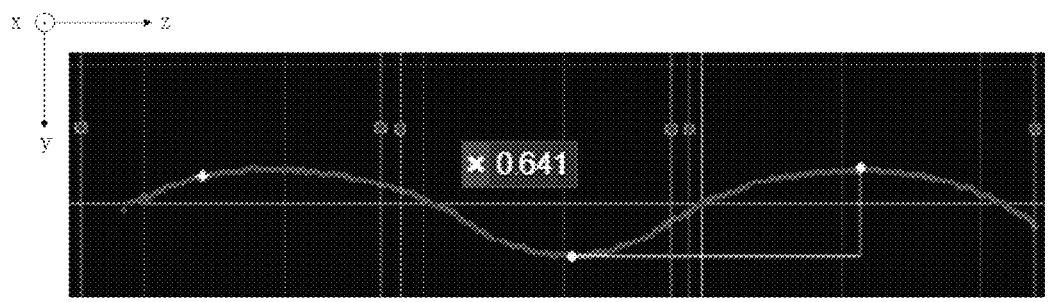
FIG. 6 is a view illustrating a profile at any one point on one side surface of the battery cell according to an embodiment of the present invention.

In this case, the scan device 100 may scan a shape of a cross section of each of the different points of one side surface 360 of the battery cell. More specifically, the scan device 100 may scan one side surface 360 of the battery cell in the form of continuous frames to generate a profile corresponding to a frame image of each of different points. For example, the scan device 100 may divide one side surface 360 of the battery cell into about 1000 points and generate a profile of the corresponding point for each point. In this case, the total number of points into which one side surface 360 of the battery cell is divided may be determined by appropriately considering a length of the battery cell, a transfer speed of the battery cell, the number of frames per second of the line sensor, and the like. FIG. 6 is a view illustrating a profile at any one point on one side surface of the battery cell according to an embodiment of the present invention. As illustrated in FIG. 6 a W-shaped bend formed on one side surface of the corresponding point may be confirmed.

Meanwhile, referring to FIG. 5 again, in the present invention, the scan device 100 may scan one side surface 360 of the battery cell simultaneously with a process of folding the wing part 355 of the battery cell. A folding unit 20 for folding the wing part 355 formed on the other side surface of the battery cell, for example, a compression roller is illustrated in FIG. 5, and while the battery cell 300 is transferred in one direction, the wing part 355 is injected into the folding unit 20 to be folded in the folding unit 20, and at the same time, one side 360 of the battery cell may be scanned by the scan device 100 on an opposite side to the wing part. Here, the scanning of the battery cell 300 may be performed in a 270° folding process of folding processes of the wing part 355 of the battery cell. This is because it may be easier to adjust a transfer speed of the battery cell to a desired speed in the 270° folding process than in a 180° folding process. However, the present invention is not limited thereto, and the scanning may also be performed simultaneously in some of all folding processes.

Next, a battery cell inspection device according to the present invention will be described. Referring to FIG. 3 again, the battery cell inspection device 200 according to the present invention may largely include a first good/bad decision unit 200A and a second good/bad decision unit 200B.

The first good/bad decision unit 200A, which is a component deciding whether the battery cell is good or bad based on a bent degree of one side surface 360 of the battery cell, may include a data obtaining unit 210A, a bend value determining unit 220A, and a first deciding unit 240A as detailed components, and may further include a region representative value selecting unit 230A.

The data obtaining unit 210A may obtain scan data obtained by scanning one side surface 360 of the battery cell by the scan device 100 from the scan device 100. In this case, the scan data may include the profile of each of the points on one side surface 360 of the battery cell as described above.

The bend value determining unit 220A may receive the scan data from the data obtaining unit 210A, and may determine a bend value indicating a bent degree of one side surface positioned at the corresponding point at each point of one side surface 360 of the battery cell based on information on each of different points of one side surface 360 of the battery cell included in the received scan data. Here, the information on each of the different points of one side surface 360 of the battery cell included in the scan data may be a profile of each point generated by the scan device 100, which is the laser line sensor. In this case, the bend value determining unit 220A may determine the bend value of each point by analyzing the profile of each point.

Figure 7:
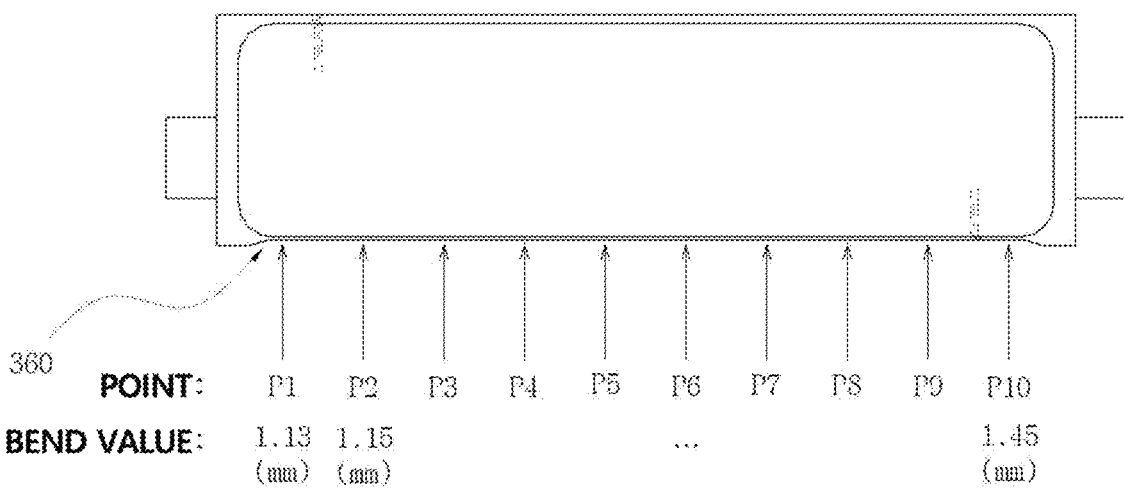
FIG. 7 is a view illustrating different points on one side surface of the battery cell according to an embodiment of the present invention.

FIG. 7 is a view illustrating different points on one side surface of the battery cell according to an embodiment of the present invention, and illustrates an example of a total of ten points P1 to P10 including a first point P1 to a tenth point P10 of one side surface 360 of the battery cell. The bend value determining unit 220A may determine a bend value of one side surface positioned at each of the points set as described above. In this case, one side surface positioned at each point may refer to a side cross section of one side surface corresponding to each point as described above, and a shape of the side cross section may be grasped through a profile of the corresponding point.

Figure 8:
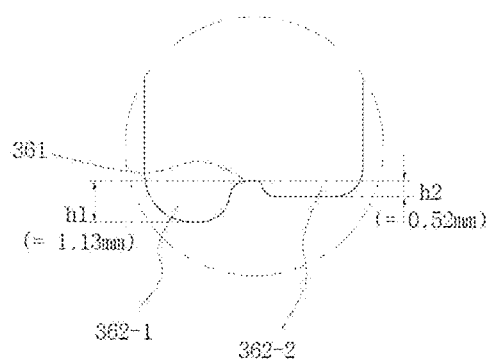
FIG. 8 is a view illustrating a side cross section of one side surface positioned at a first point of FIG. 7.

The bend value determining unit 220A may calculate a distance from the lowest point to the highest point of the bend formed on one side surface positioned at each point, and determine the calculated distance as the bend value of each point. More specifically, FIG. 8 is a view illustrating a side cross section of one side surface positioned at a first point of FIG. 7, and it may be confirmed that a W-shaped bend is formed on one side surface of the first point P1. In this case, the bend value determining unit 220A may find the lowest point at a dent part 361 of the bent and set the lowest point as a reference point, find the highest point at a first protrusion part 362-1 formed on the left side of the dent part in FIG. 8, find the highest point at a second protrusion part 362-2 formed on the right side of the dent part 361, compare a distance h1 (for example, 1.13 mm) from the reference point to the highest point of the first protrusion part 362-1 and a distance h2 (for example, 0.52 mm) from the reference point to the highest point of the second protrusion part 362-2, and then determine a larger value of the distance h1 and the distance h2 as a bend value (1.13 mm in the present embodiment) at the corresponding point.

That is, more simply, the bend value determining unit 220A may find the lowest point and the highest point in a contour of the bend displayed on each profile, calculate a distance difference between the lowest point and the highest point, and determine a calculated distance as the bend value. As described above, the bend value determining unit 220A may determine a bend value for each of the set points to determine bend values for each point for all the points. Referring to FIG. 7 again, a bend value of the corresponding point may be determined for each point of one side by the bend value determining unit 220A. For example, a bend value of P1 may be 1.13 mm, a bend value of P2 may be 1.15 mm, . . . , and a bend value of P10 may be 1.45 mm.

The first deciding unit 240A may receive information on the bend values for the respective points from the bend value determining unit 220A, and decide whether the battery cell is good or bad based on the information. More specifically, the first deciding unit 240A may decide that the battery cell is good when all of the bend values are within a preset value, for example, 2.00 mm, and decide that the battery cell is bad when any one of the bend values exceeds the preset value.

As described above, in the present invention, the bend value of the bend formed on one side surface of the battery cell may be determined for each point, it may be decided whether the battery cell is good or bad based on the bend value of the bend determined for each point, and bad battery cells of the battery cells may be excluded, such that a quality of battery cells selected as good battery cells may be constantly maintained. In addition, since degrees of bends of one side surfaces of the battery cells selected according to the present invention are within a predetermined range, the battery cells are well seated on the polymer resin layer of the battery module as described above, such that heat generation performance may be improved.

Meanwhile, according to another embodiment of the present invention, the first good/bad decision unit 200A according to the present invention may further include a region representative value selecting unit 230A in addition to the data obtaining unit 210A, the bend value determining unit 220A and the first deciding unit 240A described above. In this case, the first deciding unit 240 may additionally decide whether the battery cell is good or bad based on information received from the region representative value selecting unit 230A.

Figure 9:
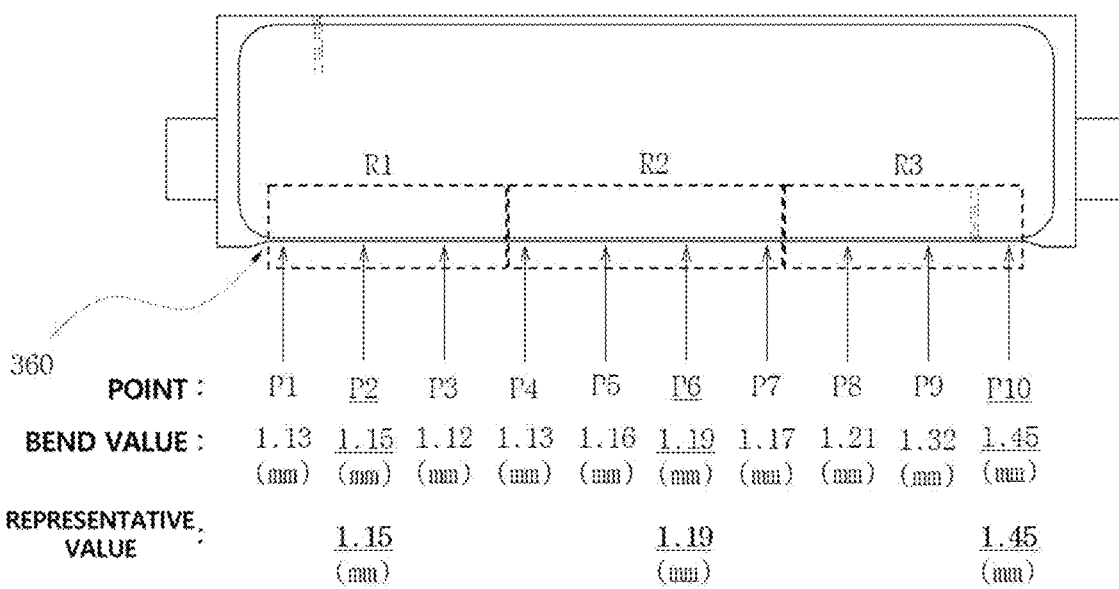
FIG. 9 is a diagram illustrating regions according to an embodiment of the present invention.

The region representative value selecting unit 230A may divide one side surface 360 of the battery cell into a plurality of regions and select a maximum value of bend values of points belonging to each region as a representative value of the corresponding region. More specifically, FIG. 9 is a diagram illustrating regions according to an embodiment of the present invention. As illustrated in FIG. 9, the region representative value selecting unit 230A may divide one side surface 360 of the battery cell into three regions R1, R2, and R3 along the x direction (see direction denotation in FIGS. 4A to 5), and select a maximum value of bend values belonging to each region as a representative value of the corresponding region. For example, the region representative value selecting unit 230A may select a bend value (1.15 mm) of a second point P2, which is a maximum value, of bend values of first to third points P1 to P3, which are points belonging to a first region R1, as a representative value of the first region R1, select a bend value (1.19 mm) of a sixth point P6, which is a maximum value, of bend values of fourth to seventh points P4 to P7, which are points belonging to a second region R2, as a representative value of the second region R2, and select a bend value (1.45 mm) of a tenth point P10, which is a maximum value, of bend values of eighth to tenth points P8 to P10, which are points belonging to a third region R3, as a representative value of the third region R3. Meanwhile, in the present embodiment, the total number of regions has been three, but the total number of regions may be freely set by a user, and the respective regions may be formed to have the same size or be formed to have different sizes.

The first deciding unit 240A according to the present embodiment may receive information on the region representative values selected for each region from the region representative value selecting unit 230A, and may additionally decide whether the battery cell is good or bad based on the information.

More specifically, the first deciding unit 240A may decide that the battery cell 300 is a good battery cell when all of the representative values of the respective regions are equal to or less than a first reference value that is preset, and decide that the battery cell 300 is a bad battery cell when at least one of the representative values of the respective regions exceeds the first reference value. The first reference value may be set by the user and stored in the first deciding unit. For example, the first reference value may be 2.00 mm. In this case, referring to FIG. 9 again, the representative value of the first region R1 is 1.15 mm, the representative value of the second region R2 is 1.19 mm, and the representative value of the third region R3 is 1.45 mm. That is, all of the representative values are equal to or less than 2.00 mm, which is the first reference value, and thus, the first deciding unit 240A may decide that the battery cell according to the present embodiment is a good battery cell.

Alternatively, when at least one of the representative values of the respective regions exceeds the first reference value, the first deciding unit 240A may decide that the battery cell is a good battery cell when the number of representative values exceeding the first reference value among the representative values is equal to or less than a reference number, and decide that the battery cell is a bad battery cell when the number of representative values exceeding the first reference value among the representative values exceeds the reference number. The reference number may also be set by the user and stored in the first deciding unit. For example, the reference number may be 1, and the first reference value may be 1.30 mm. In this case, referring to FIG. 9 again, the representative value of the third region R3 is 1.45 mm, which exceeds the first reference value. Unlike the embodiment described above, the first deciding unit 240A does not directly decide that the present battery cell is bad, and may further decide whether or not representative values of the other regions exceed the first reference value and compare the number of regions of which the representative values exceed the first reference value with the reference number to decide whether the battery cell is good or bad. According to the present embodiment, the region of which the representative value exceeds the first reference value is the third region R3, which corresponds to a case where the number of regions of which the representative values exceed the first reference value is one. In this case, the number of regions of which the representative values exceed the first reference value is equal to or less than 1, which is the set reference number, and the decision unit 240A may thus decide that the present battery cell is a good battery cell.

This is summarized in the following Table 1.

TABLE 1

| Division | Good battery cell decision | Bad battery cell decision |
| --- | --- | --- |
| "And" condition | Representative values of all regions are equal to or less than reference value | When representative value of one region exceeds reference value, NG |
| "Or" condition | The number of representative values exceeding reference value is equal to or less than reference number | When the number of representative values exceeding reference value exceeds reference number, NG |

This considers the tendency of a shape of a curved surface of one side surface of the battery cell, and is to relax a reference condition in consideration of the tendency of a shape of a bend even though a bend in a region corresponding to an outer side portion of one side surface of the battery cell in the length direction is somewhat large, such a representative value of the corresponding region exceeds a reference value because it is general that a size of a bend in a central portion of one side surface of the battery cell in the length direction is relatively large, whereas a size of a bend in an outer side portion of one side surface of the battery cell in the length direction is relatively small. Accordingly, a yield of the manufactured battery cell may be further increased. According to the present embodiment, the yield of the battery cell may be increased by considering the tendency of the shape of the curved surface of the battery cell, and a processing speed for deciding whether the battery cell is good or bad may be increased by omitting a process of comparing all of the bend values with the first reference value, selecting the representative value in each region, and comparing only the selected representative value with the first reference value.

Meanwhile, as described above, the battery cell inspection device 200 according to the present invention may further include the second good/bad decision unit 200B.

The second good/bad decision unit 200B is a component deciding whether the battery cell is good or bad based on straightness of one side surface 360 of the battery cell. Referring to FIG. 3 again, the second good/bad decision unit 200B may include a standard value calculating unit 210B, a tolerance calculating unit 220B, and a second deciding unit 230B as detailed components.

The standard value calculating unit 210B may receive information on the bend values for the respective point from the bend value determining unit 220A, and calculate a standard value for deciding tolerances of the respective bend values based on the information. In the present invention, the standard value is a criterion value for grasping how much the respective bend values are spread out from the standard value, and the standard value according to the present invention may be an average value, which is an arithmetic mean of the respective bend values, as described later, or a line fitted value derived by analyzing the respective bend values by a regression analysis method.

Figure 10:
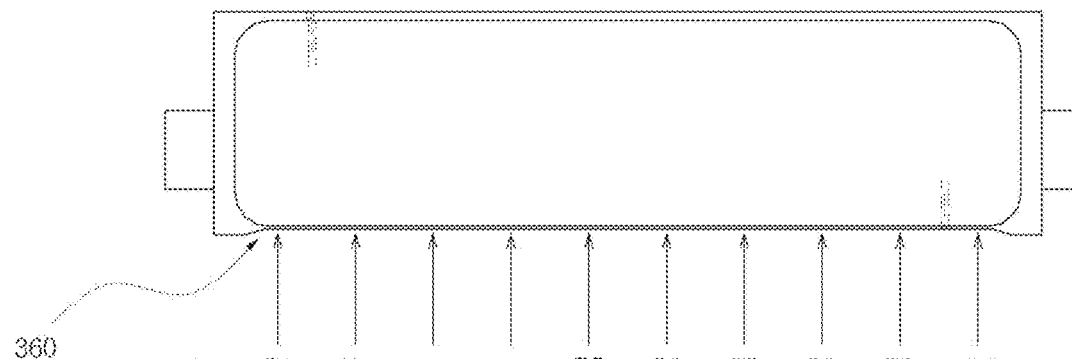
FIG. 10 is a view illustrating tolerances according to an embodiment of the present invention.

The tolerance calculating unit 220B may receive the information on the bend values for the respective points from the bend value determining unit 220A and receive information on the standard value calculated by the standard value calculating unit 210B from the standard value calculating unit 210B, and calculate a tolerance corresponding to a difference between the bend value of each point and the standard value at each point of one side surface 360 of the battery cell. As described above, the tolerance calculating unit 220B may calculate a tolerance for each of the set points to determine tolerances for each point for all the points. For example, FIG. 10 is a view illustrating tolerances according to an embodiment of the present invention. Referring to FIG. 10, an average value, which is an arithmetic mean of the bend values of the respective points P1 to P10, may be 1.173 mm, and when differences between the average value, which is the standard value, and the bend values at the respective points are calculated, a tolerance of −0.043 mm at P1, a tolerance of −0.023 mm at P2, and a tolerance of +0.277 mm at P10 may be calculated.

The second deciding unit 230B may receive information on the tolerances for the respective points from the tolerance calculating unit 220B, and decide whether the battery cell is good or bad based on the information. Specifically, the second deciding unit 230B may decide that the battery cell is a good battery cell when all of magnitudes of each of the tolerances are equal to or less than a second reference value, and decide that the battery cell is a bad battery cell when a magnitude of at least one of the tolerances exceeds second reference value. The second reference value may be, for example, 0.45 mm, and may be set by the user and stored in the second deciding unit 230B. Meanwhile, since the tolerances have both positive and negative values, the tolerance calculating unit 220B may compare only magnitudes of the tolerances with each other.

Figure 11:
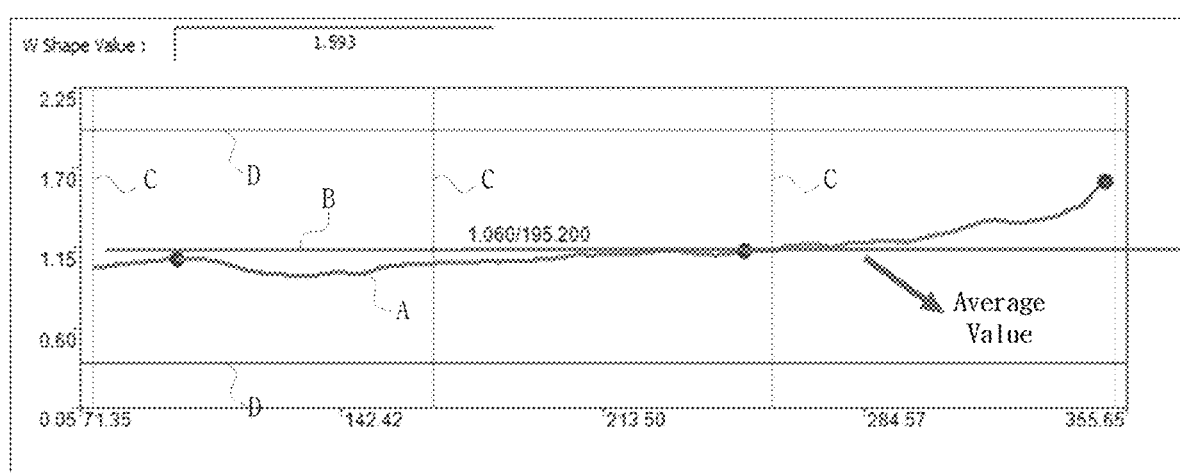
FIG. 11 is a graph illustrating bend values and an average value according to an embodiment of the present invention.

Meanwhile, the standard value calculating unit 220B may set the average value as the standard value or set the line fitted value as the standard value, as described above. FIG. 11 is a graph illustrating bend values and an average value according to an embodiment of the present invention. In FIG. 11, a line A corresponds to a set of bend values of the respective points, and a line B indicates an average value of the bend values (lines C in FIG. 11 indicate boundaries of the regions divided by the above-described region representative value selecting unit 230A, and pointing dots in the respective regions indicate representative values of the respective regions, but the respective components of the second good/bad decision unit 200B may not use these information). Here, the average value corresponds to an arithmetic average of all bend values.

Figure 12:
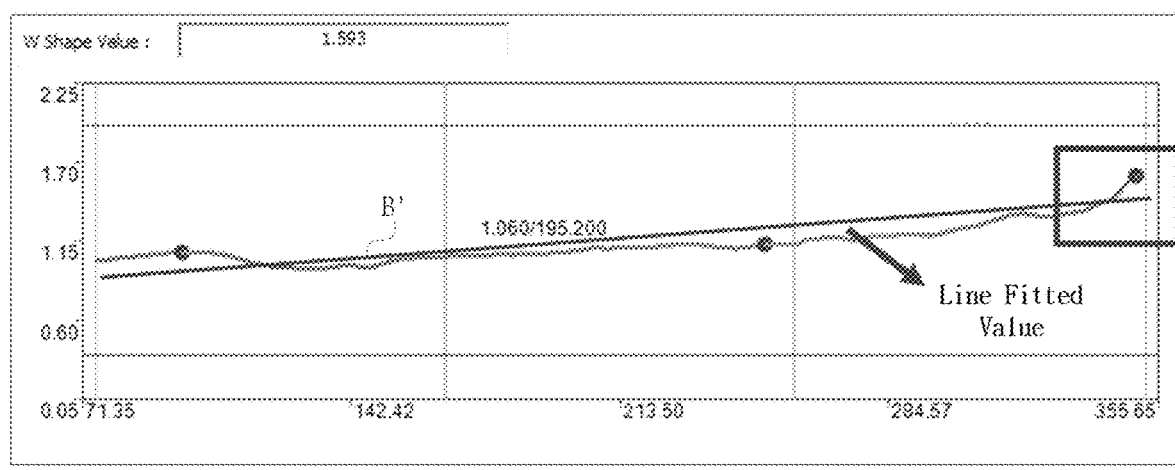
FIG. 12 is a graph illustrating bend values and a line fitted value according to an embodiment of the present invention.

On the other hand, FIG. 12 is a graph illustrating bend values and a line fitted value according to an embodiment of the present invention. Data of FIG. 12 are the same as the data of FIG. 11 except that a line fitted value rather than the average value is used as the standard value, and the line fitted value in FIG. 12 is denoted by a line B'. In the present invention, the line fitted value may be derived through a standard linear regression analysis model, and the line fitted value derived as described above may reflect a distribution tendency of the respective data, that is, the bend values of the respective points. Comparing FIGS. 11 and 12 with each other, the average value of FIG. 11 is a simple average of the bend values and may be set to the same value for all the points, whereas the line fitted value of FIG. 12 may be set to a fitting line having a predetermined gradient by reflecting the tendency that the bend values increase from the left to the right in the drawing.

In a case of using the average value, there is an advantage that it is decided whether all the battery cells are good or bad according to the same criterion, such that specification-in criteria of the manufactured battery cells are the same as each other, but there is a disadvantage that the tendency of the shape of the bend of each battery is not reflected, such that battery cells decided to be bad even though they are sufficiently usable may occur. In a case of the line fitted value, the advantage and the disadvantage in the case of using the average value are traded off, such that there is an advantage that the tendency of the shape of the bend of each battery is reflected, such that a yield of the manufactured battery cell may be increased, but there is a disadvantage that specification-in criteria of the manufactured battery cells may be different from each other as compared with the case of using the average value. Accordingly, the present invention provides both of these methods, and the user may select an appropriate method by appropriately considering the advantages and disadvantages of each method.

The above-described first good/bad decision unit 200A decides whether the battery cell is good or bad based on the bent degree of bend of the bend formed on one side surface of the battery cell, whereas the second good/bad decision unit 200B decides whether the battery cell is good or bad in consideration of the straightness of the battery cell, both of which have different purposes, and the first good/bad decision unit 200A and the second good/bad decision unit 200B are configured for different purposes. That is, even though all of the bend values or the representative values satisfy a specification-in condition by the first good/bad decision unit 200A, when any one bend value or representative value is close to 0 and the other bend value or representative value is close to the first reference value, a difference between these values may be very large, and such a battery cell may be decided as a good battery cell by the first good/bad decision unit 200A, but may be substantially unsuitable for being mounted in the battery module. The present invention may further improve a quality of the battery cell selected as a good battery cell by the present invention by deciding whether the battery cell is good or bad in terms of the straightness through the second good/bad decision unit 200B in preparation for this problem.

In this case, in the present invention, the first deciding unit 240A may primarily decide whether the battery cell is good or bad, and the second deciding unit 230B may secondarily decide whether only the battery cell decided as a good battery cell by the first deciding unit 240A is good or bad. Accordingly, when the battery cell is decided to be a bad battery cell by the first deciding unit 240A, a good/bad decision process by the second deciding unit 230B does not need to be performed, and thus, an unnecessary calculation process is omitted, such that a processing speed for deciding whether the battery cell is good or bad may be further improved.

Hereinabove, the first good/bad decision unit 200A and the second good/bad decision unit 200B have been illustrated to having different configurations in the present invention, but this is for convenience of explanation and the first good/bad decision unit 200A and its detailed components and the second good/bad decision unit 200B and its detailed components may also be configured to the same configurations.

Figure 13:
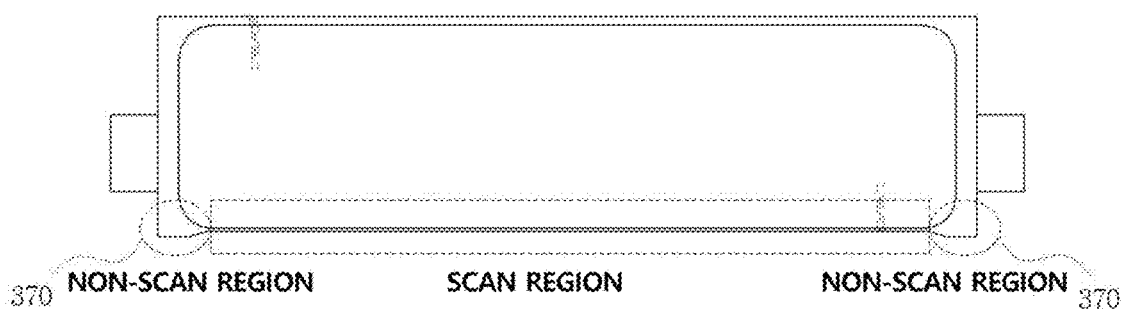
FIG. 13 is a view illustrating a scan region and non-scan regions of one side surface of the battery cell according to an embodiment of the present invention.

Meanwhile, the scan device 100 according to the present invention may not scan a partial region of the entire region of one side surface 360 of the battery cell. In this case, the partial region that is not scanned by the scan device 100 may include the extension parts 370 formed on one side surface 360 of the battery cell. As described above, the extension parts 370 may be formed on one side surface 360 of the battery cell, and may include boundary portions extending from portions where seals are not formed because the pouch case 310 is in close contact with the side surface of the electrode assembly 320 to the sealing joining parts where the pouch cases 310 are sealed. Since a bent degree of such a boundary portion is very severe, the boundary portion needs to be excluded from an inspection region. In this case, the present invention may solve the problem as described above in a manner in which the scan device 100 does not scan the corresponding region from the beginning as described above, and thus, does not generate scan data for the corresponding region. In this case, the scan device 100 may scan only a region other than the corresponding region in consideration of a speed at which the battery cell is transported and a position of the battery cell. FIG. 13 is a view illustrating a scan region and non-scan regions of one side surface of the battery cell according to an embodiment of the present invention. As illustrated in FIG. 13, only an unsealed portion of a central portion on one side surface of the battery cell may be scanned and the extension parts formed on both sides of the central portion and portions from the extension parts to both end portions of the battery cell may not be scanned.

However, the present invention is not limited thereto, and the scan device 100 may scan the entirety of one side surface 360 of the battery cell, but may solve the problem described above in a manner in which the first good/bad decision unit 200A further includes a separate selecting unit selecting only a necessary region except for an unnecessary region among scan data for the entire region of the battery cell.

As described above, the present invention provides a battery inspection device and system of deciding whether the battery cell is good or bad in consideration of the bend formed on one side surface of the battery cell, and accordingly, a good battery cell that may be mounted in the battery module through the present invention may be selected.

According to the present invention, the bend value of the bend formed on one side surface of the battery cell may be determined for each point, it may be decided whether the battery cell is good or bad based on the bend value of the bend determined for each point, and bad battery cells of the battery cells may be excluded, such that a quality of battery cells selected as good battery cells may be constantly maintained.

In addition, since degrees of bends of one side surfaces of the battery cells selected according to the present invention are within a predetermined range, the battery cells are well seated on the polymer resin layer of the battery module as described above, such that heat generation performance may be improved.

Further, in the present invention, a quality of the battery cell selected as a good battery cell by the present invention may be further improved by primarily deciding whether the battery cell is good or bad based on a bent degree of the bend formed on one surface of the battery cell and secondarily deciding whether the battery cell is good or bad based on the straightness for the bend values.

Although embodiments of the present invention have been hereinabove described with reference to the accompanying drawings, those skilled in the art to which the present invention pertains will be able to understand that the present invention may be implemented in other specific forms without departing from the spirit or essential feature of the present invention. Therefore, it is to be understood that embodiments described hereinabove are illustrative rather than being restrictive in all aspects.

What is claimed is:

1. A battery cell inspection device comprising:
 a data collector configured to obtain scan data obtained by scanning one side surface of a battery cell from a scan device scanning the one side surface;
 a bend value determiner configured to determine a bend value indicating a bent degree of one side surface positioned at a corresponding point at each point of the one side surface based on information on each of different points of the one side surface included in the scan data; and
 a first decider configured to decide whether the battery cell is good or bad based on bend values determined for each point of the one side surface by the bend value determiner.

2. The battery cell inspection device of claim 1, wherein the bend value determiner calculates a distance from the lowest point to the highest point of a bend of one side surface positioned at each point, and determines the calculated distance as a bend value of each point.

3. The battery cell inspection device of claim 1, further comprising a region representative value selector configured to divide the one side surface into a plurality of regions and selecting a maximum value of bend values of each of the points belonging to each region as a representative value of the corresponding region,
 wherein the first decider additionally decides whether the battery cell is good or bad based on representative values selected for each region by the region representative value selector.

4. The battery cell inspection device of claim 3, wherein the first decider decides that the battery cell is a good battery cell when all of the representative values of the respective regions are equal to or less than a first reference value, and decides that the battery cell is a bad battery cell when at least one of the representative values of the respective regions exceeds the first reference value.

5. The battery cell inspection device of claim 3, wherein when at least one of the representative values of the respective regions exceeds a first reference value, the first decider decides that the battery cell is a good battery cell when the number of representative values exceeding the first reference value among the representative values is equal to or less than a reference number, and decides that the battery cell is a bad battery cell when the number of representative values exceeding the first reference value among the representative values exceeds the reference number.

6. The battery cell inspection device of claim 1, further comprising:
 a standard value calculator configured to calculate a standard value for deciding a degree at which the respective bend values are spread out based on the bend values determined for each point of the one side surface by the bend value determiner;
 a tolerance calculator configured to calculate a tolerance corresponding to a difference between the bend value of each point and the standard value at each point of the one side surface; and
 a second decider configured to decide whether the battery cell is good or bad based on the tolerances calculated for each point of the one side surface by the tolerance calculator.

7. The battery cell inspection device of claim 6, wherein the second decider decides that the battery cell is a good battery cell when all of magnitudes of each of the tolerances are equal to or less than a second reference value, and decides that the battery cell is a bad battery cell when a magnitude of at least one of the tolerances exceeds second reference value.

8. The battery cell inspection device of claim 6, wherein the first decider primarily decides whether the battery cell is good or bad, and
 the second decider secondarily decides whether only a battery cell decided as a good battery cell by the first decider is good or bad.

9. The battery cell inspection device of claim 6, wherein the standard value calculator calculates an average value of the respective bend values and sets the calculated average value as the standard value.

10. The battery cell inspection device of claim 6, wherein the standard value calculator calculates a line fitted value of the respective bend values and sets the calculated line fitted value as the standard value.

11. A battery cell inspection system comprising:
 a scan device scanning one side surface of the battery cell; and
 the battery cell inspection device according to claim 1.

12. The battery cell inspection system of claim 11, wherein the scan device is a laser line sensor, and generates a profile for each of different points of the one side surface, and
 the bend value determiner determines the bend value of each point by analyzing the profile of each point.

13. The battery cell inspection system of claim 11, wherein the scan device does not scan a partial region of an entire region of the one side surface.

14. The battery cell inspection system of claim 13, wherein the partial region that is not scanned by the scan device includes extension parts formed on the one side surface of the battery cell.

15. The battery cell inspection system of claim 11, wherein the scan device scans the one side surface of the battery cell simultaneously with a process of folding a wing part of the battery cell.

* * * * *